United States Patent Office 3,816,555
Patented June 11, 1974

3,816,555
PROCESS FOR OLIGOMERISING MONO-OLEFINS
Keith George Allum, Bracknell, England, assignor to The British Petroleum Company, Limited, London, England
No Drawing. Original application June 4, 1970, Ser. No. 43,554, now Patent No. 3,729,428. Divided and this application June 6, 1972, Ser. No. 260,192
Claims priority, application Great Britain, June 17, 1969, 30,578/69
Int. Cl. C07c 3/20
U.S. Cl. 260—683.15 R
3 Claims

ABSTRACT OF THE DISCLOSURE

A catalyst for the oligomerisation of olefins e.g. butenes to octenes and dodecenes, is prepared by contacting silica gel sequentially with aqueous solutions containing (i) aluminium ions, (ii) alkali metal ions, (iii) nickel ions in that order, and then activating the catalyst by heating in air or an inert gas to 400–1000° C. The oligomers have a low degree of branching, and are produced by contacting the catalyst with the olefin at a temperature from 0 to 300° C. and a pressure from 0 to 5000 p.s.i.g.

---

This is a division of application Ser. No. 43,554, filed June 4, 1970, now U.S. Pat. No. 3,729,428.

This invention relates to a novel catalyst composition, its process of preparation and its use in the oligomerisation of olefins.

British patent specification 1,069,296 discloses a process for the production of dimers which process comprises dimerising an olefin in the presence of a catalyst prepared by (a) contacting silica gel or a material containing silica gel, the silica bearing hydrogen atoms in surface hydroxyl groups capable of ionising and exchanging, with an aqueous ionic solution of a salt of aluminium, under conditions such that aluminium ions are incorporated onto the surface of the silica gel to form a catalyst precursor base, (b) contacting the solid oxide either before or after incorporation of the aluminium ions with an aqueous solution containing nickel ions under conditions such that nickel ions are incorporated onto the surface of the oxide to form with the aluminium and silica gel, a catalyst precursor and (c) activating the catalyst precursor to form a catalyst.

It has now been found that such nickel/aluminium/silica catalysts can be further improved by the addition of alkali metal ions, particularly when the alkali metal ions are added before the nickel ions.

Thus according to one aspect of the present invention there is provided a catalyst precursor comprising silica gel having thereon ions of the metals (i) aluminium, (ii) one or more of the alkali metals and (iii) nickel.

According to another aspect of the present invention there is provided a process for the preparation of a catalyst precursor which process comprises (1) contacting silica gel, the silica gel bearing hydrogen atoms in surface hydroxyl groups capable of ionising and exchanging, with an aqueous ionic solution of a salt of aluminium, under conditions such that aluminium ions are incorporated into the surface of the silica gel to form a catalyst precursor base, (2) subsequently contacting the catalyst precursor base with an aqueous solution containing alkali metal ions under conditions such that alkali metal ions are incorporated onto the surface of the catalyst precursor base and (3) subsequently contacting the catalyst precursor base with an aqueous solution containing nickel ions under conditions such that nickel ions are incorporated onto the surface of the oxide to form with the aluminium and silica gel, a catalyst precursor.

In the case of the nickel/aluminium/silica catalyst, for highest activity with maximum selectivity to low branched products it is necessary to have a nickel:aluminium atomic ratio close to 0.5. This requires careful prolonged treatment of aluminium/silica with the nickel salt solution and is somewhat difficult to achieve especially on a large scale. It is an advantage of the present invention that for high selectivity to desired products it is not essential to employ such a high nickel:aluminium ratio. The overall catalyst preparation is therefore easier despite the addition of a further step.

Thus according to another aspect of the present invention there is provided a process for the oligomerisation of olefins which process comprises contacting an olefin under oligomerisation conditions with a catalyst prepared by (1) contacting silica gel, the silica bearing hydrogen atoms in surface hydroxyl groups capable of ionising and exchanging, with an aqueous ionic solution of a salt of aluminium, under conditions such that aluminium ions are incorporated onto the surface of the silica gel to form a catalyst precursor base, (2) subsequently contacting the catalyst precursor base with an aqueous solution containing alkali metal ions under conditions such that alkali metal ions are incorporated onto the surface of the catalyst precursor base, (3) subsequently contacting the catalyst precursor base with an aqueous solution containing nickel ions under conditions such that nickel ions are incorporated onto the surface of the oxide to form with the aluminium and silica gel, a catalyst precursor and (4) activating the catalyst precursor to form a catalyst.

Each contact may be carried out at temperatures from 0 to 110° C., preferably ambient temperature. After each contact with a solution the silica gel should be thoroughly washed with de-ionised water to remove any impregnated salt. Again this washing may be at 0 to 100° C., and is desirably continued until the wash water is free of metal ions.

By this method it is believed that a reduction in the number of free acidic aluminium-silica sites is obtained. It is believed that sodium ions replace the acidic protons associated with the aluminium on the surface of the silica and that subsequent contact with a solution containing nickel ions results in a high proportion of the sodium being replaced by nickel. Any aluminium exchanged silica site not associated with nickel is believed to be effectively blocked for polymerisation by the presence of sodium. If nickel is exchanged onto the silica gel before the alkali metal, a less active catalyst is produced.

The silica gel may be prepared from an aqueous solution of a soluble inorganic or organic silicate by hydrolysis, followed by drying and calcining at 250–600° C. A gel formed in this way will contain hydrogen atoms in surface hydroxyl groups capable of ionising and exchanging.

It is advantageous in the preparation to pretreat the silica gel before it is used for exchange. A suitable pretreatment procedure is as follows:

(a) Wash with 2 N nitric acid or N hydrochloric acid.
(b) Wash thoroughly with water.
(c) Heat to 550° C. for up to three days under air or nitrogen.

It is also advantageous in the preparation to treat the aluminium salt solution used for exchange in such a way as to maximise the pH of the solution. This may be obtained in the case of an aluminium sulphate solution by percolation through a bed of alumina.

Preferably the solution of the aluminium salt has an initial concentration not less than M/20.

Preferably contacting with the solution of the aluminium salt is continued until 0.1 to 5% by weight, expressed as a percentage by weight of the silica gel, of the aluminium ion is incorporated onto the surface of the silica.

Preferably the solution has an initial pH in the range 2 to 3.8, being less than that at which the hydroxide is formed.

The preferred aluminium salt from which the aluminium ions are obtained is aluminium sulphate but the nitrate is also suitable.

The aluminium exchanged silica can also be prepared by the treatment of silica with aluminium triethyl and hydrolysing the product.

Suitable alkali metal containing solutions can be prepared from bicarbonates, carbonates and chlorides. The alkali metal solution can be of any initial concentration up to the saturation concentration. The time of contact is preferably limited to a maximum of 5 hours, to avoid damage to the silica.

Preferably the amount of alkali metal added is from 0.1 to 5% by weight expressed as a percentage by weight of the silica gel, more particularly 0.1 to 2% wt. The preferred alkali metal is sodium.

Suitable nickel containing solutions may be prepared from water soluble salts of nickel, e.g., nickel nitrate, sulphate or chloride, and the complexes formed when normally water insoluble compounds, e.g., nickel formate are dissolved in aqueous ammonia.

Preferably the nickel solution has an initial concentration not less than M/100.

Preferably contacting with the nickel solution is continued until 0.1–5% by weight, expressed as percent by weight of the silica gel, of nickel ions is incorporated onto the surface of the silica. Preferably the nickel content is 0.1 to 2% wt.

Activation is achieved by heating in air or an inert gas to a temperature in the range 400–1000° C. Preferably activation is at 450–700° C. and the time of heating is ½ hour or longer although at the higher temperatures shorter activation times may be possible.

The particle size of the catalyst is governed by the particle size of the silica gel initially taken and can be of any size convenient to the oligomerisation procedure. It is desirable to start with a high surface area silica gel to obtain high activity, i.e., preferably a surface area greater than 100 square metres per gram.

The oligomerisation process of the present invention is preferably carried out at a temperature between 0° C. and 300° C. and at a pressure of between atmospheric and 3000 p.s.i.g. in either a batch process or a continuous process. Preferably the pressure is such that liquid phase conditions are maintained in the reaction zone. Preferred temperatures and pressures are 15 to 200° C. and atmosphere to 2000 p.s.i.g.

In a batch process the oligomerisation is preferably carried out at a catalyst concentration of between 1 g. and 200 g. of catalyst per litre of olefin in the feed.

In a continuous process the oligomerisation is preferably carried out at a weight hourly space velocity of between 0.01 and 20 g. of olefin feed per g. of catalyst per hour.

Low molecular weight gaseous or liquid mono-olefins containing 2–10 carbon atoms or any mixtures of these may be oligomerised. The oligomerised products contain a high proportion of dimers, although some trimers and tetramers are produced.

Preferred feedstocks are propylene and butenes, butene-2 giving oligomers with a greater degree of branching than butene-1. The catalyst is particularly useful for the conversion of mixtures of propylene and butenes to a range of olefins containing 6 to 8 carbon atoms for the conversion of n-butenes into dodecenes. With feedstocks containing a high proportion of butene-1 there may be some isomerisation of it to butene-2. This reaction is exothermic and heat may have to be withdrawn from the system to control the temperature. The presence of a diluent will also help in controlling the temperature rise.

The oligomerisation may be carried out in the presence of a diluent. Suitable diluents are hydrocarbons, e.g., paraffinic hydrocarbons such as n-heptane or cyclohexane and aromatic hydrocarbons such as toluene. Commercial olefin streams frequently contain alkanes. Their presence has been found not to be detrimental and they may, as indicated above, be beneficial in some instances as a diluent.

The invention is illustrated by the following examples.

EXAMPLE 1

A catalyst was prepared as follows. Four hundred g. of silica gel was acid washed with 4 litres of 2 N nitric acid during 6 hours and was then washed with 12 litres of water. After being heated to 550° C. in air for 3 days the silica was placed in a column and an alumina-treated M/10 aluminium sulphate solution (pH 3.6–3.7) was slowly percolated through the column. The percolation was continued until the solution coming out of the column had a pH of 3.5–3.6 (approximately 7 days). The silica was washed with water in a Soxhlet apparatus for 3 days. Sodium was exchanged onto the aluminium/silica by the percolation of 1 litre of M/10 sodium bicarbonate solution through the silica followed by a 3 day water wash in a Soxhlet apparatus. Nickel was exchanged for sodium on the silica by the slow percolation of M/10 nickel nitrate solution through a bed of the exchanged silica for 14 days. After water washing in a Soxhlet apparatus for 3 days and drying at 120° C., the catalyst was activated at 550° C. in a stream of nitrogen for 4 hours. The catalyst contained 1.45 percent by weight of aluminium, 0.36 percent by weight of sodium, and 0.70 percent by weight of nickel.

Part of the catalyst (18 g.) was used to oligomerise butene-1 at 80° C. and 800 p.s.i.g. in a 1 litre rocking autoclave for 18 hours. The liquid oligomers (172 g.) were found to consist of 82 percent by weight of octenes, 14 percent by weight of dodecenes, and 4 percent by weight of higher molecular weight oligomers. The activity of the catalyst was 0.54 g. of product per g. of catalyst per hour. The octenes were found to consist of 27 percent by weight of 3,4-dimethylhexenes, 53 percent by weight of 3-methylheptenes, 18 percent by weight of n-octenes, and 2 percent by weight of other structures. This represents an average of 1.11 branches per molecule. The dodecenes had an average of 2.76 branches per molecule.

EXAMPLE 2

A part of the catalyst prepared in Example 1 (118 g.) was used to oligomerise butene-1 in daily batches at 80° C. and 800 p.s.i.g. in a 3 litre rocking autoclave for 24 consecutive days. The activity of the catalyst decreased from 0.20 g. of product per g. of catalyst per hour (1st day) to 0.14 g. of product per g. of catalyst per hour (24th day). Of the liquid oligomers, 65 percent by weight was octenes on the first day and this rose to 85 percent by weight on the 24th day. The average degree of branching of the octenes decreased from 1.24 (1st day) to 0.92 (24th day) and of the dodecenes from 3.05 (1st day) to 2.16 under these conditions. A substantially longer half life might be expected under conditions of continuous operation.

EXAMPLE 3

In this example 9 g. of catalyst containing 0.89 percent by weight of aluminium, 0.02 percent by weight of sodium, and 0.75 percent by weight of nickel, was used to oligomerise butene-1 at 80° C. and 800 p.s.i.g. in a 1 litre rocking autoclave for 22 hours. Liquid oligomers (319 g.) were obtained representing an activity of 1.61 g. of product per g. of catalyst per hour. The composition of the products was as follows, 90 percent by weight of octenes, 15 percent by weight of dodecenes and 5 percent by weight of olefins of higher molecular weight. The octenes had the following structures, 18 percent by weight of 3,4-dimethylhexenes, 69 percent by weight of 3-methylheptenes, and 13 percent by weight of n-octenes. This represents an average of 1.07 branches per molecule. The dodecenes had an average of 2.46 branches per molecule.

EXAMPLE 4

In this example the catalyst was prepared by taking a nickel and aluminium exchanged silica gel and adding a small amount of sodium by impregnation. The catalyst contained 0.29 percent by weight of aluminium, 0.20 percent by weight of nickel, and 0.05 percent by weight of sodium. The catalyst (21 g.) had an activity of 0.15 g. of product per g. of catalyst per hour when used to oligomerise butene-1 at 80° C. in a 1 litre rocking autoclave for 20 hours. The oligomers (62 g.) were found to consist of 85 percent by weight of octenes. The octenes had the following composition, 17 percent by weight of 3,4-dimethylhexenes, 61 percent by weight of 3-methylheptenes, 20 percent by weight of n-octenes, and 2 percent by weight of other structures. This represents an average of 0.99 branches per molecule. This catalyst, which was prepared by adding the sodium after the nickel, was less active than catalysts in which the sodium was exchanged before the nickel.

EXAMPLE 5

A catalyst was prepared containing 0.80 percent by weight nickel, 0.90 percent by weight aluminium and 0.02 percent by weight sodium and was activated in air at 550° C. for 70 hours. Part of this catalyst (10 g.) was used for propylene oligomerisation in a 1 litre rocking autoclave at 85° C./750 p.s.i.g. for 4 hours. An activity of 4.0 g./g./h. was observed. Products consisted of dimers 86 percent weight, of which 31.0 percent was n-hexenes and 64.5 percent was methylpentenes, trimers 11.7 percent and tetramers and other heavier oligomers 2.1 percent.

EXAMPLE 6

A catalyst was prepared containing 1.2 percent weight nickel, 1.7 percent aluminium and 0.4 percent weight sodium and was activated in nitrogen at 550° C. for 17 hours at a gas rate of 1000 vol./vol./h. Part of the catalyst (4.9 g.) was used for propylene oligomerisation in a 1 litre rocking autoclave at 77° C./700 p.s.i.g. for 4 hours. An activity of 14.6 h./g./h. was observed. Products consisted of dimers 71.5 percent weight of which 28.6 percent was n-hexenes and 63.0 percent was methylpentenes, trimers 19.7 percent weight and tetramers and other heavier oligomers 8.8 percent weight.

EXAMPLE 7

Part (14 g.) of the catalyst used in Example 6 was used for propyleneoligomerisation in a continuous flow system. Propylene was passed over the catalyst in the liquid phase at a rate of 2.0 vol./vol./h. at 700 p.s.i.g. Temperature was increased from 76° C. to 155° C. during the course of the experiment. Propylene conversion to oligomers was over 90 percent weight. The product distributions observed at the various temperatures are summarised in the following table.

| Temperature,° C | 76 | 84 | 121 | 125 | 155 |
|---|---|---|---|---|---|
| Percent weight: | | | | | |
| Dimers | 70.3 | 62.8 | 37.5 | 33.8 | 32.9 |
| Trimers | 20.8 | 25.6 | 31.0 | 31.2 | 39.3 |
| Tetramers, etc | 8.9 | 11.6 | 31.5 | 35.0 | 27.8 |
| Dimer fraction: | | | | | |
| n-Hexenes | 29.0 | 32.1 | 49.2 | 51.2 | 60.7 |
| Methylpentenes | 64.5 | 60.8 | 45.5 | 43.8 | 35.7 |

EXAMPLE 8

A catalyst was prepared containing 0.62 percent weight nickel, 0.74 percent weight aluminium and 0.11 percent weight sodium. Part of this catalyst (102 g.) was used for butene oligomerisation in a flow system. The butene feed contained 74 percent weight butene-2 and 24 percent weight butene-1. This feed was passed over the catalyst in the liquid phase at a space velocity of 2.0 vol./vol./h. at 1000 p.s.i.g. and at a temperature of 150° C. Butene conversion to oligomers was 47 percent weight and the selectivity to octenes was 81 percent weight. The octenes had the following composition, 37 percent weight of 3,4-dimethylhexenes, 46 percent weight of 3-methylheptenes, 11 percent weight of n-octenes and 6 percent weight of other structures. This represents an average of 1.30 branches per molecule.

EXAMPLE 9

The catalyst used in Example 8 was used for oligomerisation of a mixture of butenes and propylene which also contained unreactive butanes. The feed composition, was 19 percent weight of propylene, 12 percent weight of butene-1, 3 percent of isobutene, 34 percent weight of butene-2 and 32 percent weight of butanes. A flow system was used for this reaction and the feed was passed over the catalyst in the liquid phase at a space velocity of 3.0 vol./vol./h. at 1000 p.s.i.g. and 150° C. The total olefin conversion to oligomers was 46 percent and the composition of the product was 22 percent weight of hexenes, 37 percent weight of heptenes, 20 percent weight of octenes and 21 percent weight of higher boiling material. The average number of branches per molecule in the $C_6$–$C_8$ olefins was 1.24.

I claim:

1. A process for the oligomerisation of olefins comprising contacting a feedstock containing at least one mono-olefin having from 2 to 10 carbon atoms at 0 to 300° C. and atmospheric to 3000 p.s.i.g. pressure with a catalyst prepared by (1) contacting silica gel, the silica gel bearing hydrogen atoms in surface hydroxyl groups capable of ionising and exchanging, with an aqueous ionic solution of a salt of aluminium, under conditions such that aluminium ions are incorporated onto the surface of the silica gel to form a catalyst precursor base, (2) subsequently contacting the catalyst precursor base with an aqueous solution containing alkali metal ions under conditions such that alkali metal ions are incorporated onto the surface of the catalyst precursor base, (3) subsequently contacting the catalyst precursor base with an aqueous solution containing nickel ions under conditions such that nickel ions are incorporated onto the surface of the silica gel to form with aluminium, alkali metal, and silica gel a catalyst precursor, the silica gel being thoroughly washed with de-ionised water after each contacting operation to remove any impregnated salt and the amounts of aluminium, alkali metal and nickel added each being within the range 0.1 to 5% by wt., all by weight of the silica gel, and (4) activating the catalyst by heating same in a stream of air or an inert gas to a temperature in the range 400 to 1000° C.

2. A process as claimed in claim 1 wherein the oligomerisation temperature is from 15 to 200° C. and the pressure from atmospheric to 2000 p.s.i.g.

3. A process as claimed in claim 2 wherein the feedstock contains propylene, a butene, or both propylene and at least one butene.

References Cited

UNITED STATES PATENTS

| 2,881,233 | 4/1959 | Clark | 260—683.15 |
| 3,005,033 | 10/1961 | Engelbrecht et al. | 260—683.15 |
| 3,557,242 | 1/1971 | Sampson et al. | 260—683.15 |

FOREIGN PATENTS

| 1,069,296 | 5/1967 | Great Britain | 260—683.15 |

PAUL M. COUGHLAN, Jr., Primary Examiner

PO-1050
(5/69)

UNITED STATES PATENT OFFICE
CERTIFICATE OF CORRECTION

Patent No. 3,816,555  Dated June 11, 1974

Inventor(s) Keith George Allum

It is certified that error appears in the above-identified patent and that said Letters Patent are hereby corrected as shown below:

Column 5, line 16, change "80°C" to - - 80°C psig - -.

Signed and sealed this 1st day of October 1974.

(SEAL)
Attest:

McCOY M. GIBSON JR.
Attesting Officer

C. MARSHALL DANN
Commissioner of Patents